(12) United States Patent
Snyder, III

(10) Patent No.: US 10,330,320 B2
(45) Date of Patent: Jun. 25, 2019

(54) CIRCUMFERENTIALLY AND AXIALLY STAGED ANNULAR COMBUSTOR FOR GAS TURBINE ENGINE

(71) Applicant: United Technologies Corporation, Farmington, CT (US)

(72) Inventor: Timothy S. Snyder, III, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 400 days.

(21) Appl. No.: 15/025,817

(22) PCT Filed: Oct. 21, 2014

(86) PCT No.: PCT/US2014/061532
§ 371 (c)(1),
(2) Date: Mar. 29, 2016

(87) PCT Pub. No.: WO2015/108583
PCT Pub. Date: Jul. 23, 2015

(65) Prior Publication Data
US 2016/0245525 A1    Aug. 25, 2016

Related U.S. Application Data

(60) Provisional application No. 61/895,151, filed on Oct. 24, 2013.

(51) Int. Cl.
*F23R 3/00* (2006.01)
*F23R 3/34* (2006.01)
(Continued)

(52) U.S. Cl.
CPC ............. *F23R 3/346* (2013.01); *F23R 3/002* (2013.01); *F23R 3/06* (2013.01); *F23R 3/14* (2013.01); *F23R 3/50* (2013.01); *Y02T 50/675* (2013.01)

(58) Field of Classification Search
CPC .. F23R 3/286; F23R 3/34; F23R 3/343; F23R 3/346; F23R 3/46; F02C 7/222; F02C 7/228; F05D 2270/31
See application file for complete search history.

(56) References Cited

U.S. PATENT DOCUMENTS 3,872,664 A * 3/1975 Lohmann .................. F23R 3/14
431/9
4,194,358 A * 3/1980 Stenger ..................... F23R 3/34
60/39.826
(Continued)

FOREIGN PATENT DOCUMENTS

JP          08068537          3/1996

OTHER PUBLICATIONS

EP search report for EP14878606.4 dated Nov. 21, 2016.

*Primary Examiner* — Carlos A Rivera
(74) *Attorney, Agent, or Firm* — O'Shea Getz P.C.

(57) ABSTRACT

A combustor section for a gas turbine engine includes an outer wall assembly and an inner wall assembly inboard of the outer wall assembly to define an annular combustion chamber therebetween. A forward fuel injection system is in communication with the combustion chamber. A downstream fuel injection system is in communication with the combustion chamber through the outer wall assembly and a swirl mixer system in communication with the combustion chamber through the inner wall assembly.

13 Claims, 9 Drawing Sheets

(51) Int. Cl.
  *F23R 3/06* (2006.01)
  *F23R 3/14* (2006.01)
  *F23R 3/50* (2006.01)

(56) References Cited

U.S. PATENT DOCUMENTS

| | | | |
|---|---|---|---|
| 4,891,936 A | 1/1990 | Shekleton et al. | |
| 5,003,771 A * | 4/1991 | Kester | F02C 7/228 60/243 |
| 5,257,502 A * | 11/1993 | Napoli | F02C 7/228 60/739 |
| 5,285,635 A * | 2/1994 | Savelli | F23R 3/42 60/747 |
| 5,289,685 A * | 3/1994 | Hoffa | F02C 7/222 60/739 |
| 5,321,951 A * | 6/1994 | Falls | F23R 3/34 60/740 |
| 5,402,634 A * | 4/1995 | Marshall | F02C 7/232 60/734 |
| 5,417,069 A * | 5/1995 | Alary | F23R 3/04 60/747 |
| 5,884,483 A * | 3/1999 | Munro | F02C 7/22 60/734 |
| 6,289,667 B1 | 9/2001 | Kolaczkowski et al. | |
| 6,550,251 B1 * | 4/2003 | Stickles | F23R 3/14 239/403 |
| 7,665,305 B2 | 2/2010 | Cornwell et al. | |
| 7,738,694 B2 | 6/2010 | Prociw et al. | |
| 7,870,736 B2 | 1/2011 | Homitz et al. | |
| 7,896,620 B1 | 3/2011 | Ewing, Jr. | |
| 7,966,821 B2 * | 6/2011 | Zupanc | F23R 3/343 60/748 |
| 8,057,224 B2 | 11/2011 | Knoepfel | |
| 8,079,218 B2 | 12/2011 | Widener | |
| 8,113,001 B2 | 2/2012 | Singh et al. | |
| 8,117,846 B2 | 2/2012 | Wilbraham | |
| 8,162,287 B2 | 4/2012 | Overman et al. | |
| 8,192,688 B2 | 6/2012 | Hagen et al. | |
| 8,240,150 B2 | 8/2012 | Varatharajan et al. | |
| 8,262,344 B2 | 9/2012 | Alexander et al. | |
| 8,316,644 B2 | 11/2012 | Wilbraham | |
| 8,387,390 B2 | 3/2013 | Haynes | |
| 8,495,982 B2 | 7/2013 | Laster et al. | |
| 8,789,374 B2 * | 7/2014 | Hoke | F23R 3/06 60/746 |
| 2009/0084082 A1 * | 4/2009 | Martin | F01D 9/023 60/39.281 |
| 2010/0071377 A1 | 3/2010 | Fox et al. | |
| 2010/0223930 A1 | 9/2010 | Chila | |
| 2010/0242483 A1 * | 9/2010 | Snyder | F23R 3/06 60/748 |
| 2012/0186262 A1 | 7/2012 | Hoke | |
| 2013/0019604 A1 * | 1/2013 | Cunha | F23N 5/16 60/772 |
| 2013/0031906 A1 | 2/2013 | Dicintio et al. | |
| 2013/0340436 A1 * | 12/2013 | Abreu | F02C 7/222 60/737 |
| 2014/0338359 A1 | 11/2014 | Valeev et al. | |
| 2016/0298852 A1 * | 10/2016 | Snyder, III | F23R 3/46 |

\* cited by examiner

| POWER CONDITION | PILOT FUEL | M1 FUEL | M2 FUEL |
|---|---|---|---|
| LOW | 100% | OFF | OFF |
| PARTIAL | 20–40% | 80–60% | OFF |
| HIGH | ≈ 20% | 30–40% | 30–40% |

CIRCUMFERENTIALLY AND AXIALLY STAGED ANNULAR COMBUSTOR FOR GAS TURBINE ENGINE

CROSS-REFERENCE TO RELATED APPLICATION

This application claims priority to PCT Patent Application No. PCT/US14/61532 filed Oct. 21, 2014, which claims priority to U.S. Provisional Application Ser. No. 61/895,151 filed Oct. 24, 2013, which are hereby incorporated herein by reference in their entireties.

BACKGROUND

The present disclosure relates to a gas turbine engine and, more particularly, to a combustor section therefor.

Gas turbine engines such as those that power modern commercial and military aircraft, generally include a compressor section to pressurize an airflow, a combustor section to burn a hydrocarbon fuel in the presence of the pressurized air, and a turbine section to extract energy from the resultant combustion gases.

The combustor section generally includes radially spaced apart inner and outer liners that define an annular combustion chamber therebetween. The inner and outer liners each typically includes an outer support shell lined with heat shields, often referred to as floatwall liner panels, to line an annular combustion chamber.

Combustion of the hydrocarbon fuel in the presence of pressurized air may produce nitrogen oxide ($NO_x$) emissions that are subjected to excessively stringent controls by regulatory authorities, and thus may be sought to be minimized. NOx formation is not only a function of temperature, but also of flame residence time and Oxygen concentration in the reaction zone. Increasing the flame strain tends to reduce the residence time in the flame, but may also increase the Oxygen concentration in the flame. These intermediate effects of strain rates tend to increase the production rate of NOx. At high strain rates, however, the reduction in flame temperature overcomes the influence of the Oxygen concentration, and NOx production rates are reduced.

SUMMARY

A combustor section for a gas turbine engine, according to one disclosed non-limiting embodiment of the present disclosure, includes an outer wall assembly and an inner wall assembly inboard of the outer wall assembly to define an annular combustion chamber therebetween. A forward fuel injection system is in communication with the annular combustion chamber. A downstream fuel injection system is in communication with the annular combustion chamber through the outer wall assembly. A swirl mixer system is in communication with the annular combustion chamber through the inner wall assembly.

In a further embodiment of the present disclosure, the downstream fuel injection system includes a multiple of first downstream fuel nozzles that alternate with a multiple of second downstream fuel nozzles.

In a further embodiment of the present disclosure, the multiple of first downstream fuel nozzles and the multiple of second downstream fuel nozzles are fueled in pairs.

In a further embodiment of any of the foregoing embodiments of the present disclosure, the multiple of first downstream fuel nozzles are fueled through the multiple of second downstream fuel nozzles such that the multiple of first downstream fuel nozzles are each downstream to a respective one of the multiple of second downstream fuel nozzles.

In a further embodiment of any of the foregoing embodiments of the present disclosure, a valve is included in each of the multiple of second downstream fuel nozzles which selectively communicate fuel to a respective one of the multiple of first downstream fuel nozzles.

In a further embodiment of any of the foregoing embodiments of the present disclosure, each of the multiple of first downstream fuel nozzles is operable to generate a first main zone within the annular combustion chamber. Each of the multiple of second downstream fuel nozzles is operable to generate a second main zone within the annular combustion chamber.

In a further embodiment of any of the foregoing embodiments of the present disclosure, the swirl mixer system includes a multiple of swirlers. Each of the swirlers defines a quench zone directed circumferentially between each first main zone and each associated second main zone.

In a further embodiment of any of the foregoing embodiments of the present disclosure, each quench zone overlaps with a respectively adjacent quench zone to define a shear region.

In a further embodiment of any of the foregoing embodiments of the present disclosure, the forward fuel injection system includes a multiple of forward fuel injectors. Each of the forward fuel injectors operable to generate a pilot zone.

In a further embodiment of any of the foregoing embodiments of the present disclosure, each of the pilot zones are circumferentially located between each first main zone and each associated second main zone.

In a further embodiment of any of the foregoing embodiments of the present disclosure, sixteen (16) pilot zones; sixteen (16) quench zones; eight first main zones; and eight (8) second main zones are included.

In a further embodiment of any of the foregoing embodiments of the present disclosure, each of the pilot zones is circumferentially located in line with each first main zone.

In a further embodiment of any of the foregoing embodiments of the present disclosure eight (8) pilot zones; sixteen (16) quench zones; eight first main zones; and eight (8) second main zones are included.

A method of communicating fuel to a combustor section of a gas turbine engine, according to another disclosed non-limiting embodiment of the present disclosure, includes communicating pilot fuel axially into an annular combustion chamber; communicating fuel radially inboard into the annular combustion chamber; and communicating a multiple of quench zones radially outboard into the annular combustion chamber.

In a further embodiment of any of the foregoing embodiments of the present disclosure, the method includes circumferentially varying the fuel communicating radially inboard into the combustion chamber to control combustion dynamics.

In a further embodiment of any of the foregoing embodiments of the present disclosure, the method includes selectively communicating the fuel radially inboard into the combustion chamber as circumferentially alternating first and second main zones.

In a further embodiment of any of the foregoing embodiments of the present disclosure, the method includes selectively activating the second main zones.

In a further embodiment of any of the foregoing embodiments of the present disclosure, the method includes selectively communicating the fuel radially inboard into the annular combustion chamber through a multiple of first downstream fuel nozzles each operable to generate a first main zone within the annular combustion chamber. A multiple of second downstream fuel nozzles each operable to generate a second main zone within the annular combustion chamber.

In a further embodiment of any of the foregoing embodiments of the present disclosure, the multiple of first downstream fuel nozzles are each downstream to a respective one of the multiple of second downstream fuel nozzles to circulate fuel through the multiple of second downstream fuel nozzles when the multiple of second downstream fuel nozzles are inactive.

In a further embodiment of any of the foregoing embodiments of the present disclosure, each quench zone overlaps with a respectively adjacent quench zone to define a shear region.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 7 is a chart of example power conditions for the fuel-air and quench zones;

DETAILED DESCRIPTION

Figure 1:
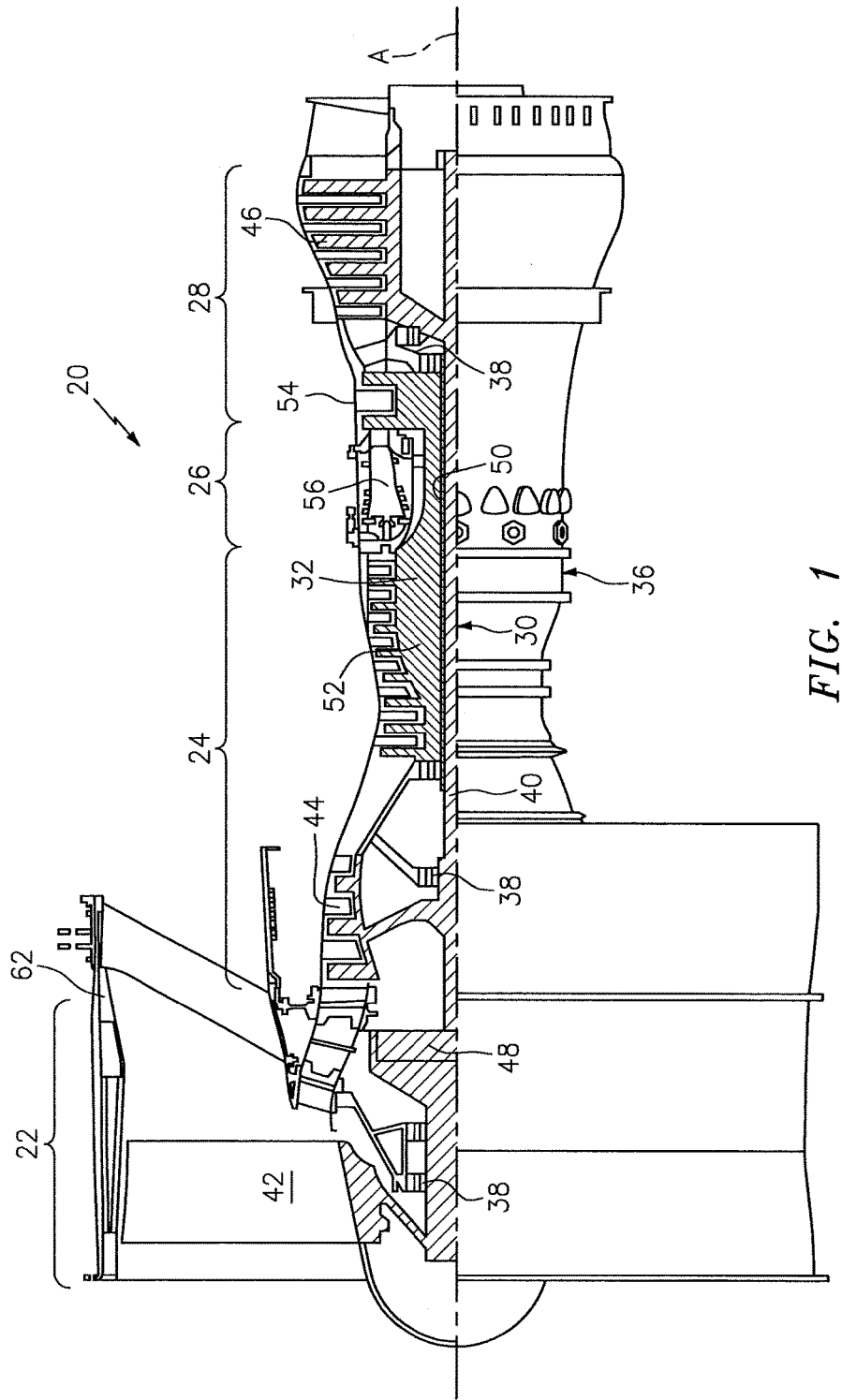
FIG. 1 is a schematic cross-section of an example gas turbine engine architecture.
Figure 2:
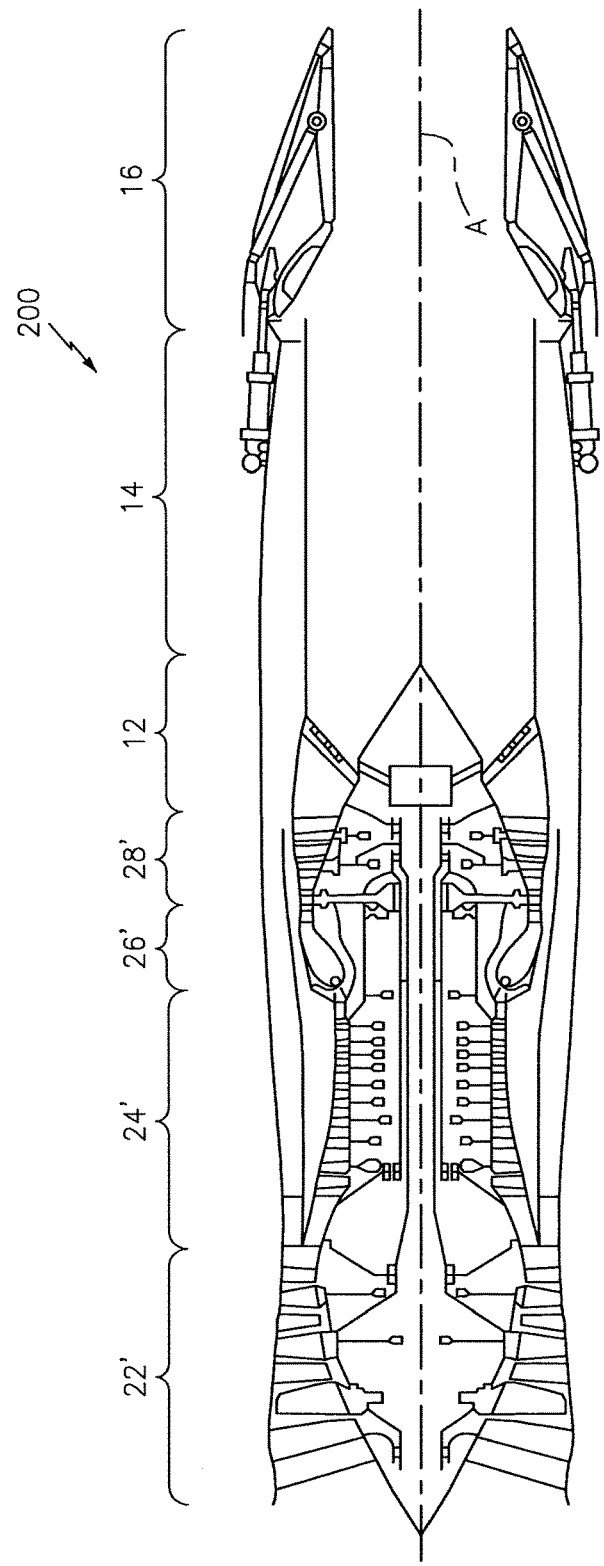
FIG. 2 is a schematic cross-section of another example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engine architectures 200 might include an augmentor section 12, an exhaust duct section 14 and a nozzle section 16 in addition to the fan section 22', compressor section 24', combustor section 26' and turbine section 28' (FIG. 2) among other systems or features. The fan section 22 drives air along a bypass flowpath and into the compressor section 24 to drive core air along a core flowpath. The core air is compressed then communicated into the combustor section 26 for downstream expansion through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans with an intermediate spool.

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 may drive the fan 42 directly or through a geared architecture 48 (see FIG. 1) to drive the fan 42 at a lower speed than the low spool 30. An example reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

Figure 3:
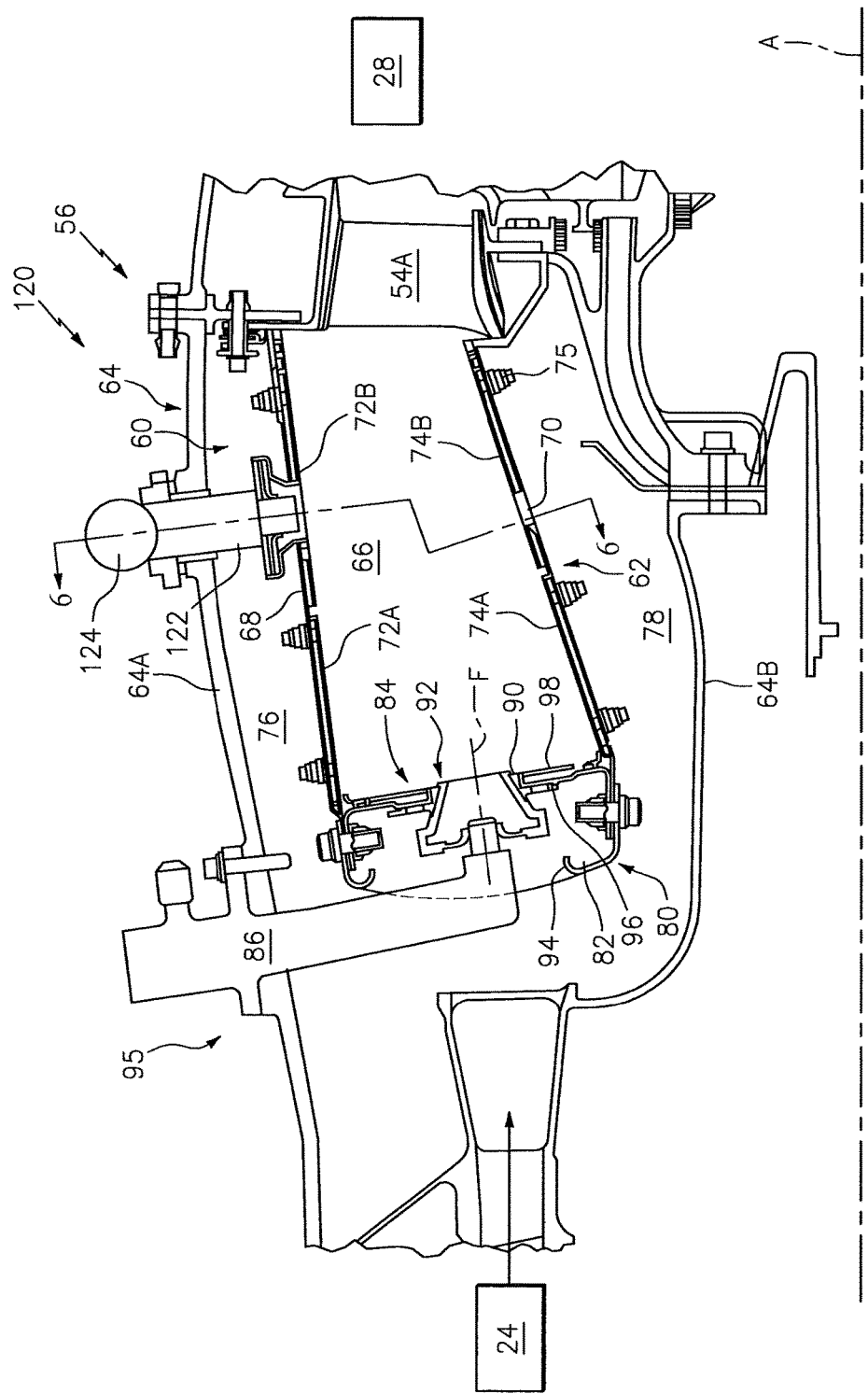
FIG. 3 is an expanded longitudinal schematic sectional view of a combustor section according to one non-limiting embodiment that may be used with the example gas turbine engine architectures shown in FIGS. 1 and 2.

With reference to FIG. 3, the combustor section 26 generally includes a combustor 56 with an outer combustor wall assembly 60, an inner combustor wall assembly 62 and a diffuser case module 64 therearound. The outer combustor wall assembly 60 and the inner combustor wall assembly 62 are spaced apart such that an annular combustion chamber 66 is defined therebetween.

The outer combustor wall assembly 60 is spaced radially inward from an outer diffuser case 64A of the diffuser case module 64 to define an outer annular plenum 76. The inner combustor wall assembly 62 is spaced radially outward from an inner diffuser case 64B of the diffuser case module 64 to define an inner annular plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

The combustor wall assemblies 60, 62 contain the combustion products for direction toward the turbine section 28. Each combustor wall assembly 60, 62 generally includes a respective support shell 68, 70 which supports one or more liner panels 72, 74 mounted thereto. Each of the liner panels 72, 74 may be generally rectilinear and manufactured of, for example, a nickel based super alloy, ceramic or other temperature resistant material and are arranged to form a liner array. In the liner array, a multiple of forward liner panels 72A and a multiple of aft liner panels 72B are circumferentially staggered to line the outer shell 68. A multiple of forward liner panels 74A and a multiple of aft liner panels 74B are circumferentially staggered to also line the inner shell 70.

The combustor 56 further includes a forward assembly 80 immediately downstream of the compressor section 24 to receive compressed airflow therefrom. The forward assembly 80 generally includes an annular hood 82 and a bulkhead assembly 84 that supports a multiple of swirlers 90 (one shown). Each of the swirlers 90 is circumferentially aligned with one of a multiple of fuel nozzles 86 (one shown) and a respective hood port 94. The multiple of fuel nozzles 86, swirlers 90 and associated fuel communication structure defines a forward fuel injection system 95 that supports combustion in the combustion chamber 66.

The bulkhead assembly 84 includes a bulkhead support shell 96 secured to the combustor walls 60, 62, and a multiple of circumferentially distributed bulkhead liner panels 98 secured to the bulkhead support shell 96 around each respective swirler opening 92. The bulkhead support shell 96 is generally annular and the multiple of circumferentially distributed bulkhead liner panels 98 are segmented, typically one to each fuel nozzle 86 and swirler 90.

The annular hood 82 extends radially between, and is secured to, the forwardmost ends of the combustor wall assemblies 60, 62. The multiple of circumferentially distributed hood ports 94 facilitate the direction of compressed air into the forward end of the combustion chamber 66 through each respective swirler 90. Each fuel nozzle 86 may be secured to the diffuser case module 64 to project into the respective swirler 90 along an axis F.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and inner support shells 68, 70 are mounted adjacent to a first row of Nozzle Guide Vanes (NGVs) 54A in the HPT 54. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 4:
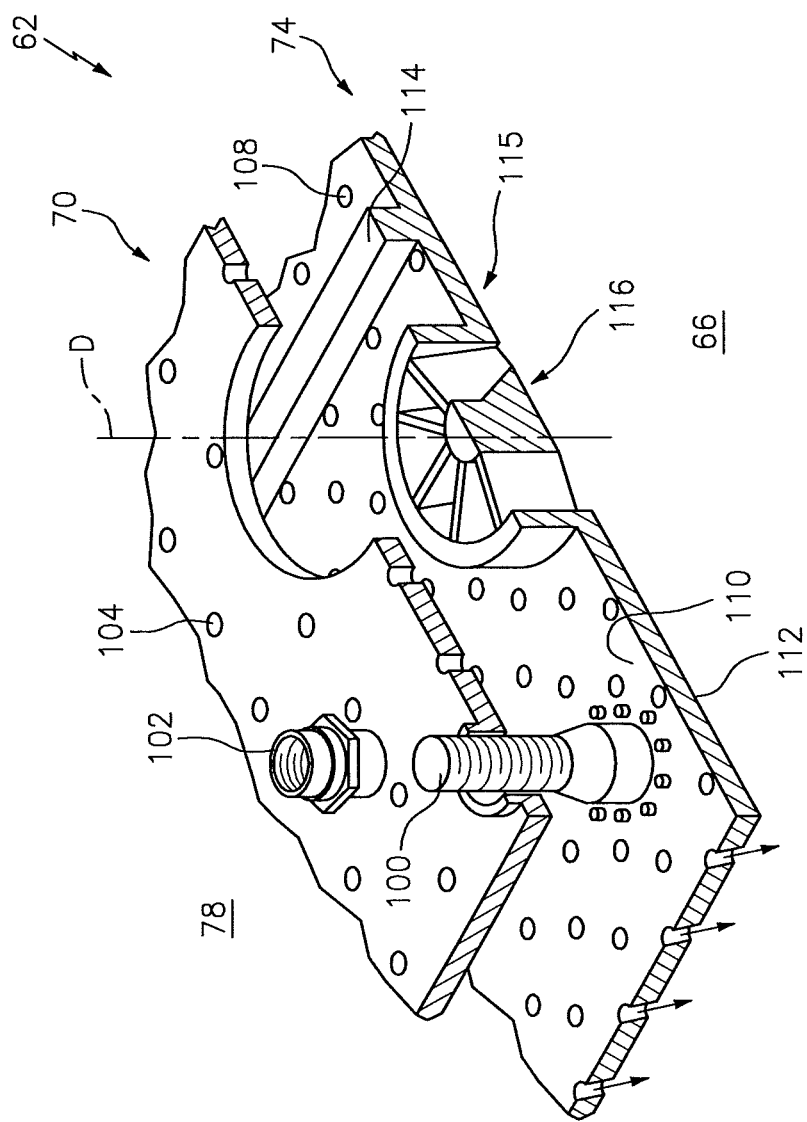
FIG. 4 is an exploded view of a wall assembly with a dilution passage formed by an annular grommet according to one disclosed non-limiting embodiment.

Each combustor wall assembly 60, 62 (only the inner wall assembly 62 shown in FIG. 4) includes a multiple of studs 100 that extend from the liner panels 72, 74 so as to permit the liner panels 72, 74 to be mounted to their respective support shells 68, 70 with fasteners 102 such as nuts. The studs 100 project rigidly from the liner panels 72, 74 through the respective support shells 68, 70 to receive the fasteners 102 at a threaded distal end section thereof to define one or more impingement cavities 106. The liner panels 72, 74 typically include one or more rails 114 (shown partially) that extend from a cold side 110 thereof. The rail 114 extends around the periphery of the cold side 110 (also shown in FIG. 5) to interface with their respective support shells 68, 70 when mounted thereto to define the one or more impingement cavities 106; however, other internal rails may alternatively or additionally be provided to define additional compartments.

A multiple of cooling impingement passages 104 penetrate through the support shells 68, 70 to allow air from the respective annular plenums 76, 78 to enter impingement cavities 106 formed within the combustor wall assemblies 60, 62 between the respective support shells 68, 70 and liner panels 72, 74. The cooling impingement passages 104 are generally normal to the surface of the liner panels 72, 74. The air in the cavities 106 provides cold side impingement cooling of the respective liner panels 72, 74 that is generally defined herein as heat removal via internal convection.

A multiple of effusion passages 108 penetrate through each of the liner panels 72, 74. The geometry of the passages (e.g., diameter, shape, density, surface angle, incidence angle, etc.) as well as the location of the passages with respect to the high temperature combustion gas flow also contributes to effusion film cooling. The combination of impingement passages 104 and effusion passages 108 may be referred to as an Impingement Film Floatwall (IFF) assembly.

The effusion passages 108 allow the air to pass from each cavity 106 defined in part by the cold side 110 of the liner panels 72, 74 to a hot side 112 thereof and facilitate the formation of a relatively cool insulating blanket of air along the hot side 112. The effusion passages 108 are generally more numerous than the impingement passages 104 to promote the development of a sheath of film cooling along the hot side 112. Film cooling as defined herein is the introduction of a relatively cooler air at one or more discrete locations along a surface exposed to a high temperature environment to protect that surface in the region of the air injection as well as downstream thereof.

A swirl mixer system 115 generally includes a multiple of air admission passages 116 that penetrate through the respective support shell 70 and liner panels 74 each along a common axis D. The air admission passages 116 quench the hot combustion gases within the combustion chamber 66 by direct supply of cooling air from the inner annular plenum 78.

With continued reference to FIG. 3, a downstream fuel injection system 120 communicates with the combustion chamber 66 downstream of the forward fuel injection system 95. The downstream fuel injection system 120 includes a multiple of downstream fuel nozzles 122 (illustrated schematically) located around the outer wall assembly 60 to introduce a portion of the fuel required for desired combustion performance; e.g., emissions, operability, durability as well as to lean-out the fuel contribution provided by the multiple of axial fuel nozzles 86. Each of the multiple of downstream fuel nozzles 122 are located along an axis R generally transverse to the axis F of the axial fuel nozzles 86. The downstream fuel injection system 120 generally includes a radially outer fuel manifold 124 (illustrated schematically) that communicates fuel to the multiple of downstream fuel nozzles 122. It should be appreciated that various mount arrangements may alternatively or additionally provided inside or outside the diffuser case 64.

Each of the multiple of downstream fuel nozzles 122 direct fuel through a downstream swirler 126 located coaxially with a radial outer port 134 in the outer wall assembly 60 for communication of an air-fuel mixture into the combustion chamber 66. Each downstream swirler 126 includes an inner swirler 128 and an outer swirler 130 located within a convergent passageway 132 that converge inward to each port 134 that accelerates airflow from the inner swirler 128 and the outer swirler 130. The inner swirler 128 and the outer swirler 130 initially counter swirl the airflow from the outer plenum 78 which then cancel each other out within the convergent passageway 132 to form an essentially axial flow fuel-air mixture jet into the combustion chamber 66.

The multiple of air admission passages 116 are located in the inner wall assembly 62 to generally oppose the multiple of downstream fuel nozzles 122. A swirler 140 is disposed in each of the multiple of air admission passages 116 for imparting a swirl to the air directed into the combustion chamber. In legacy gas turbine combustors, this air is admitted to quench the partially-combusted combustion product gases as solid column-like jets designed to penetrate deeply into the flow of partially-combusted combustion products passing through the zone.

Figure 5:
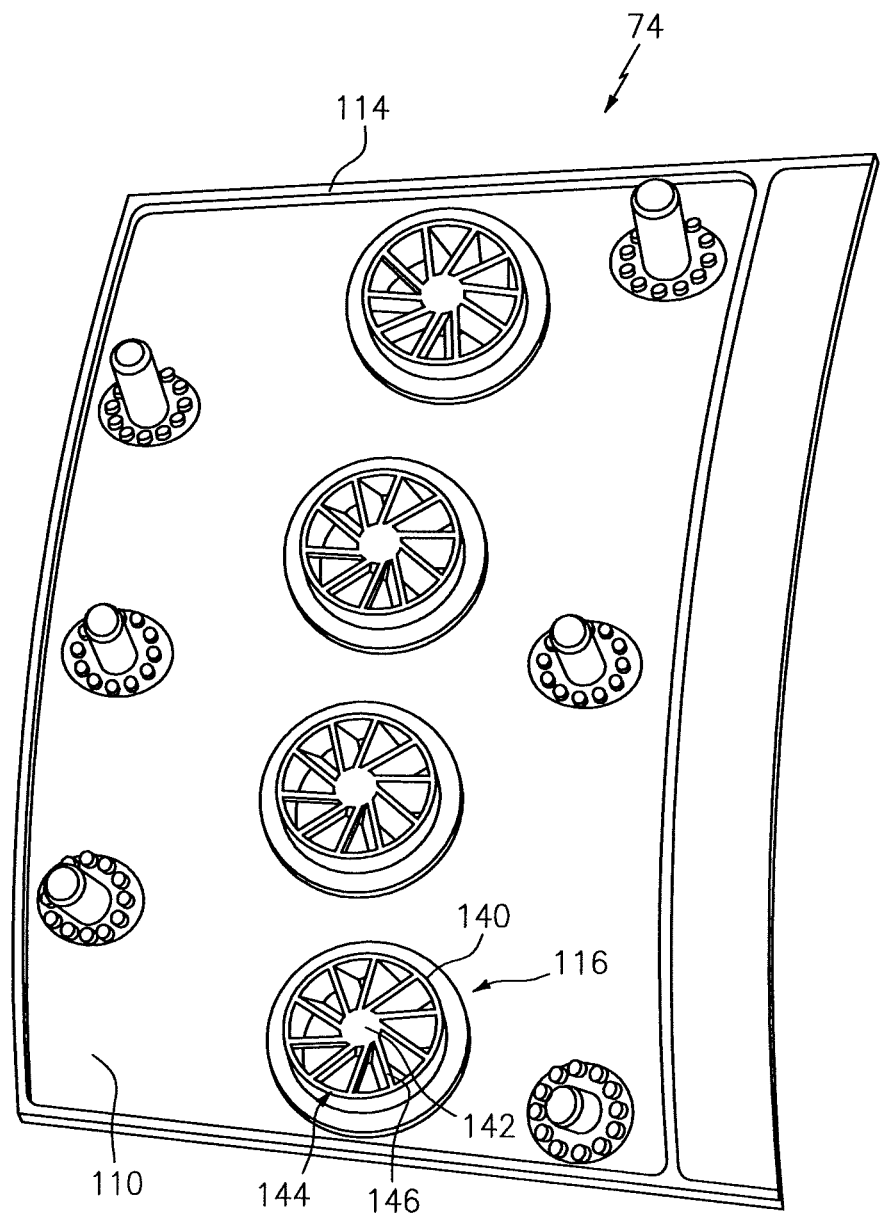
FIG. 5 is a perspective view of an inner liner panel with a multiple of quench swirlers.

Each of the swirlers 140 includes a central hub 142, an outer shroud 144 disposed radially outwardly of and circumscribing the central hub 142, and a plurality of circumferentially distributed vanes 146 that extend outwardly from the central hub 142 to the inner wall of the outer shroud 144 (FIG. 5). The vanes 146 are disposed at a desired vane angle so as to impart a desired degree of swirl to the combustion air admitted into the combustion chamber 66.

The degree of swirl imparted to the combustion air is directly proportional to the magnitude of the vane angle, a smaller vane angle imparting a lesser degree of swirl to the combustion air and a larger vane angle imparting a greater degree of swirl to the combustion air. The vanes 146 may be disposed within the swirler 140 at a vane angle as measured in degrees departure from the vertical, ranging from as small as about 10 degrees to as high as about 50 degrees, and nominally in the range from about 15 degrees to about 25 degrees, in one example.

The swirl strength desired, and therefore the vane angle selected for a given application, generally depends on the ratio of the momentum of the quench air jets admitted through the air admission passages 116 to the momentum of the main flow of the combustion product gases. For a given combustor design, the greater that the magnitude of this momentum ratio is, the higher the swirl strength that can be applied while still achieving sufficient penetration and mixing, and therefore the larger the vane angle desired. Conversely, the lower that the magnitude of this momentum ratio is, the smaller the swirl strength that can be applied while still achieving sufficient penetration and mixing, and therefore the smaller the vane angle desired.

The number of vanes in a given swirler will depend upon the particular application. In general, the central hub 142 must be sufficiently large to package and support the number vanes 146 that extend between the central hub 142 and the outer shroud 144 but small enough that the central hub 142, in combination with the vanes 146 that extend therefrom, to leave at least 70%, by line of sight, of the area circumscribed by the outer shroud 144 open to air flow therethrough (FIG. 5). For purposes of example, but not limitation, the swirler 140 may have a central hub 142 having a diameter of about 0.1875 inches (4.7625 millimeters), an outer shroud 144 having an inner diameter of about 0.65 inches (16.5 millimeters), and have ten (10) vanes, each disposed at a vane angle of twenty (20) degrees.

The forward fuel injection system 95 generates a multiple of pilot zones P from the forward assembly 80. Each of the pilot zones P from each of the fuel nozzles 86 provide a swirled fuel-air mixture directed into the combustion chamber 66 generally along the axis F. The downstream fuel injection system 120 generates a main zone M fuel-air mixture directed into the combustion chamber 66 from the outer wall assembly 60 generally transverse to the axis F (also shown in FIG. 6). The swirl mixer system 115 generates a main zone M fuel-air mixture directed into the combustion chamber 66 from the inner wall assembly 62 generally transverse to the axis F (also shown in FIG. 6).

The downstream fuel injection system 120 includes a multiple of first downstream fuel nozzles 122A that alternate with a multiple of second downstream fuel nozzles 122B that receive fuel from the radially outer fuel manifold 124. The radially outer fuel manifold 124 communicates with the multiple of first and second downstream fuel nozzles 122A, 122B in pairs. In this disclosed non-limiting embodiment, a fuel stem 150 from the radially outer fuel manifold 124 communicates fuel to one of the first multiple of downstream fuel nozzle 122A first through an adjacent one of the multiple of second downstream fuel nozzles 122B. That is, each of the multiple of downstream fuel nozzle 122A are downstream an associated one of the multiple of second downstream fuel nozzles 122B with respect to fuel flow.

A valve 152 (illustrated schematically) is associated with each of the multiple of second downstream fuel nozzles 122B such that under an example low power condition and partial power condition, the valve 152 is closed to direct fuel to the one of the first multiple of downstream fuel nozzle 122A yet circulate fuel through the multiple of second downstream fuel nozzles 122B to avoid fuel coking therein. That is, each fuel stem 150 feeds one of the multiple of first downstream fuel nozzles 122A and thru the valve 152, one of the multiple of second downstream fuel nozzles 122B of each associated pair fueled by the fuel stem 150.

In one disclosed non-limiting operational embodiment (FIG. 7), under a low power condition such as idle, the forward fuel injection system 95 receives 100% of the fuel while the first and multiple of second downstream fuel nozzles 122A, 122B receive 0% of the fuel. Under a partial power condition such as cruise, the forward fuel injection system 95 receives about 20%-40% of the fuel, the multiple of first downstream fuel nozzles 122A receive the balance of about 80%-60% of the fuel and the multiple of second downstream fuel nozzles 122B receive 0% of the fuel as the valve 152 is closed. Notably, the fuel first circulates thru the multiple of second downstream fuel nozzles 122B when the valve 152 is closed prior to communication to the respective multiple of first downstream fuel nozzles 122A in each pair. Under a high power condition such as takeoff, the forward fuel injection system 95 receives about 20% of the fuel, the multiple of first downstream fuel nozzles 122A receive about 30%-40% of the fuel and the multiple of second downstream fuel nozzles 122B receive about 30%-40% of the fuel as the valve 152 is open.

Advantageously, other fuel distributions may alternatively or additionally provided for these as well as other operational conditions. For example, the fuel distribution between the first and multiple of second downstream fuel nozzles 122A, 122B may be readily circumferentially varied to control combustion dynamics. Such control of combustion dynamics may be additionally be utilized to vary the acoustic field within the combustor 56.

Figure 6:
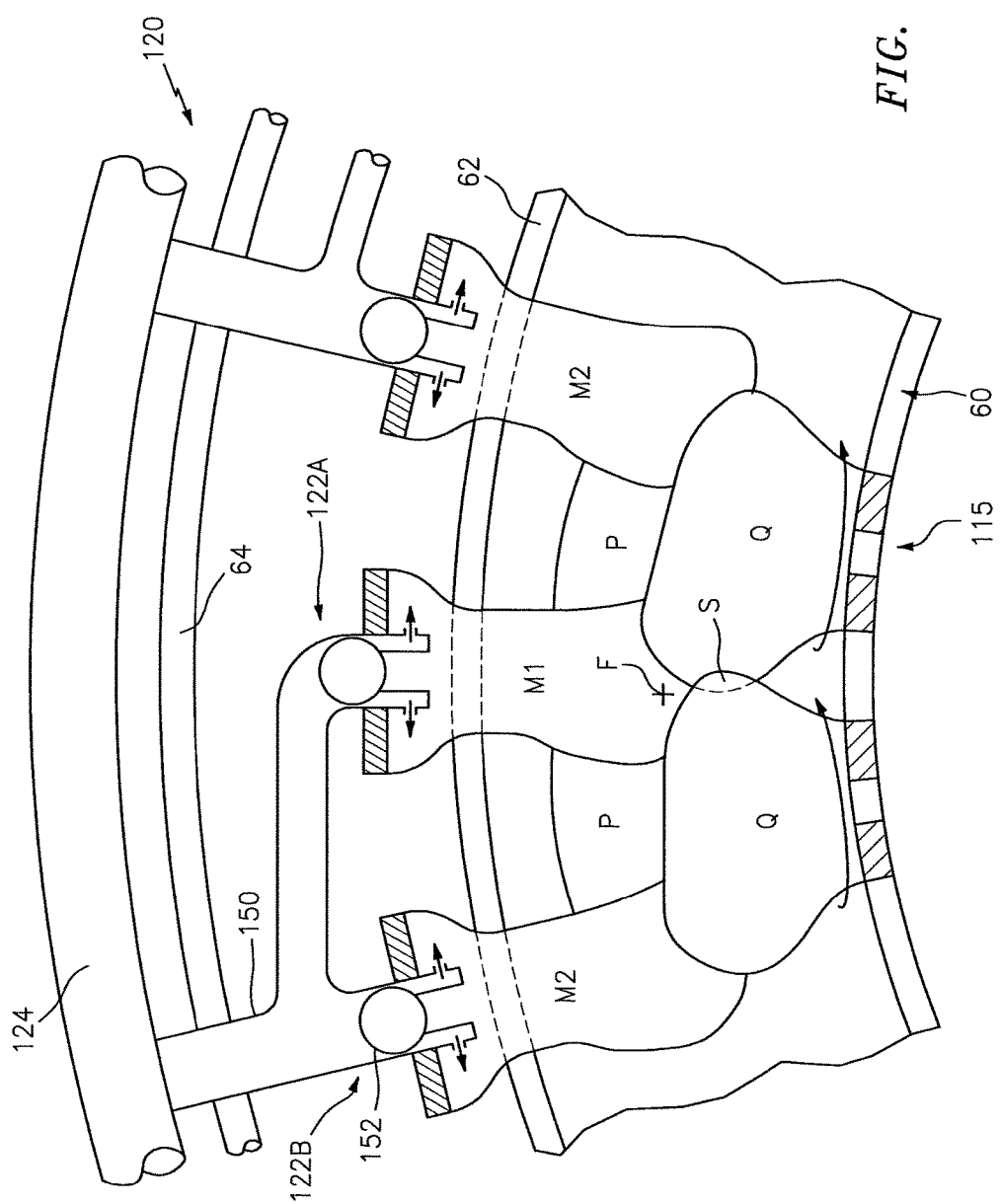
FIG. 6 is a schematic sectional view of a combustor section with fuel-air and quench zones according to one non-limiting embodiment.
Figure 8:
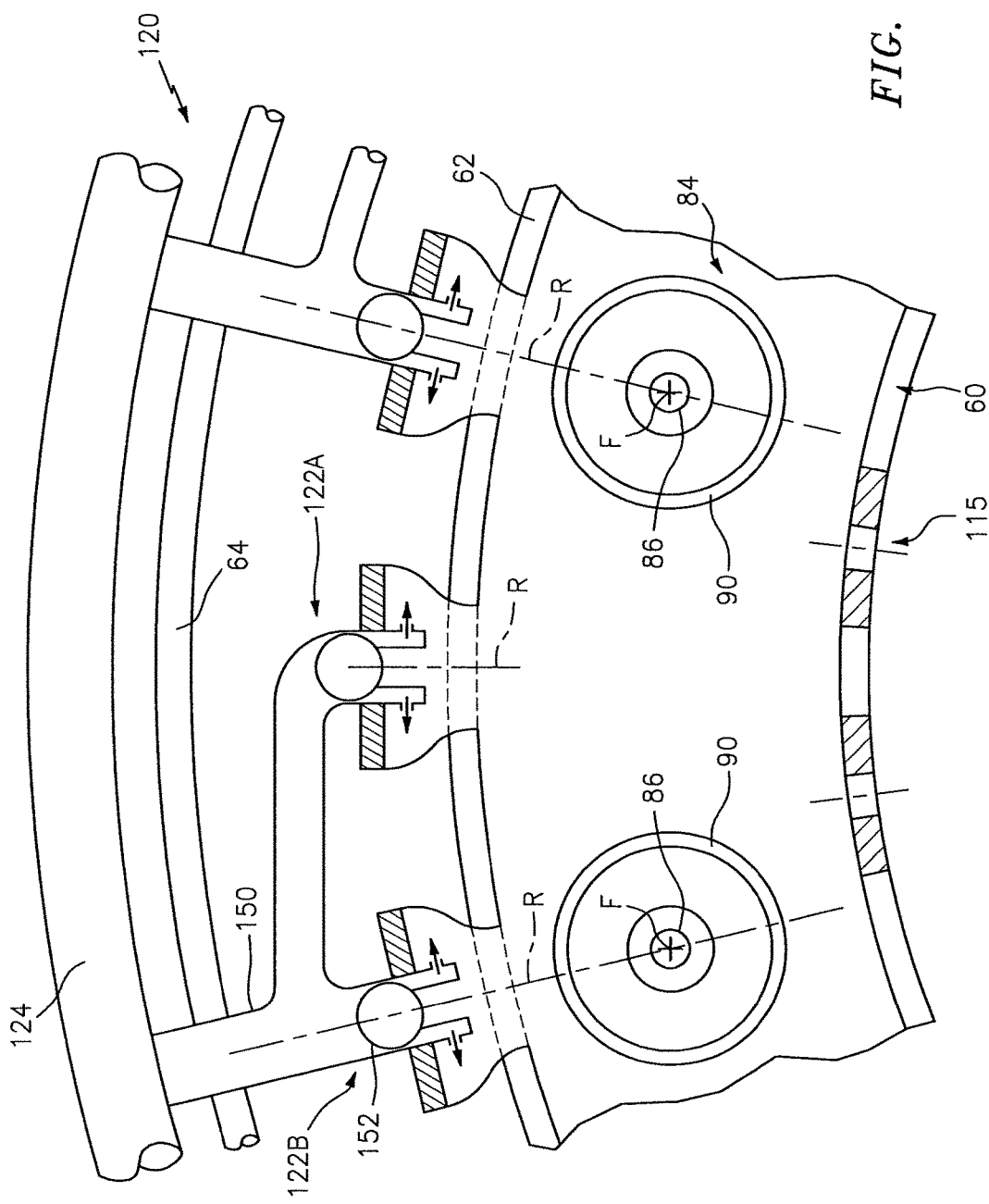
FIG. 8 is an aft looking forward lateral schematic sectional view according to one disclosed non-limiting embodiment.

With reference to FIG. 6, in one disclosed non-limiting embodiment, each of the multiple of first downstream fuel nozzles 122A generates a first main zone M1 fuel-air mixture directed into the combustion chamber 66 from the outer wall assembly 60 generally transverse to the axis F while the multiple of second downstream fuel nozzles 122B generates a second main zone M2 fuel-air mixture directed into the combustion chamber 66 from the outer wall assembly 60 generally transverse to the axis F. Each of the multiple of air admission passages 116 of the swirl mixer system 115 generates a swirled quench zone Q directed opposite to and circumferentially between respective first and second main zones M1, M2. Each of the multiple of pilot zones P centered along its respective axis F are located circumferentially in line with one of the multiple of air admission passages 116 (FIG. 8). That is, the number of pilot zones P, the number of quench zones Q and the total number of first and second main zones M1, M2 are equal. For purposes of example, but not limitation, sixteen (16) pilot zones P; sixteen (16) quench zones Q; eight (8) first main zones M1; and eight (8) second main zones M2 are provided.

Each pair of swirled mix zones Q intersect in a shear region S that is circumferentially aligned with one of the respective multiple of first main zones M1. That is, each of the swirlers 140 swirl in a consistent direction and overlap such that the overlap therebetween defines the shear region S. Each of the swirled mix zones Q also span respective pairs of first and second main zones M1, M2. The swirled mix zones Q thereby facilitate mixing of all three stages to, for example, reduce NOx emissions. The quench swirl strength may be readily optimized through the swirler 140 to achieve a desired mixture of stages and penetration.

Figure 9:
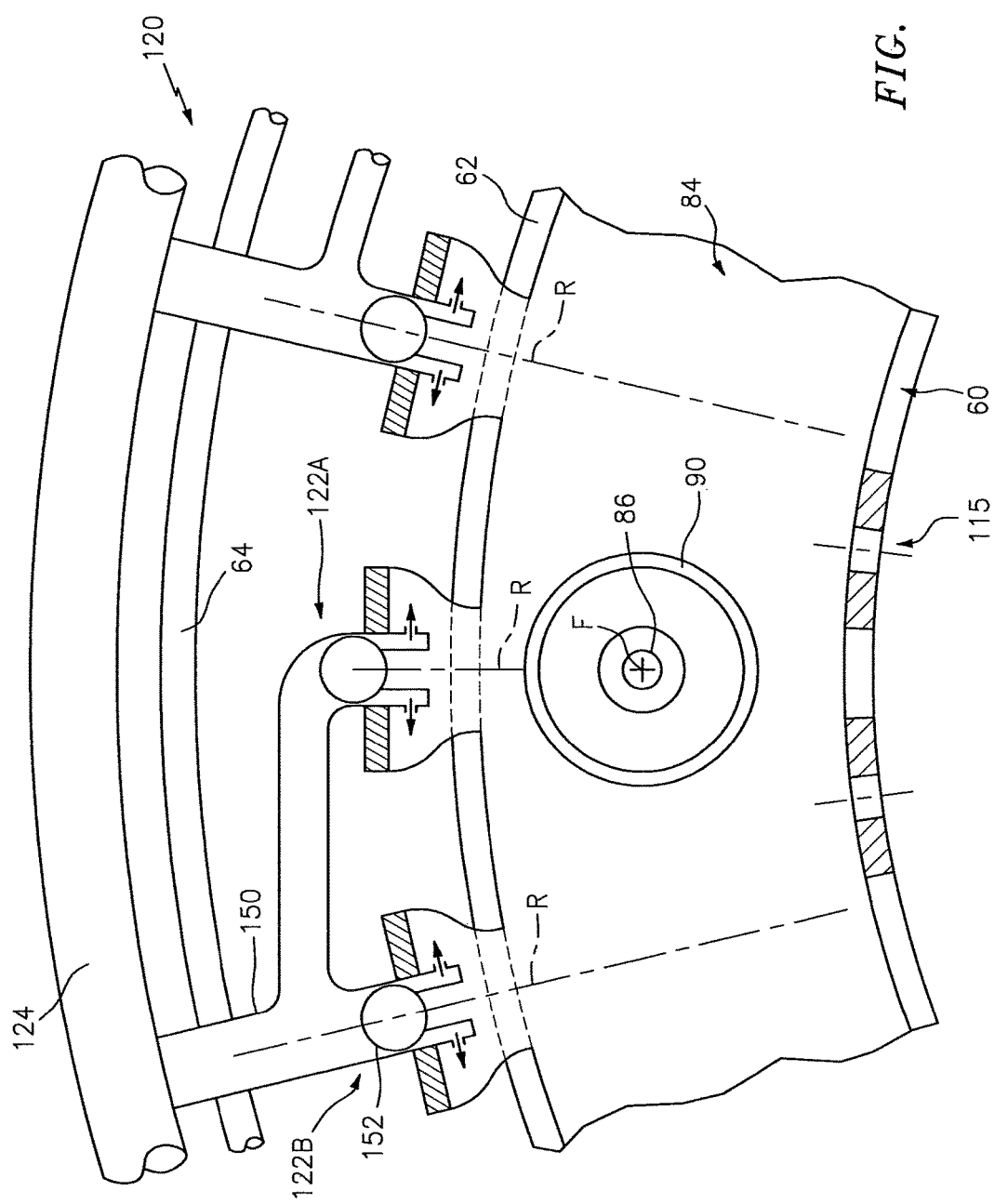
FIG. 9 is an aft looking forward lateral schematic sectional view according to another disclosed non-limiting embodiment.

With reference to FIG. 9, in another disclosed non-limiting embodiment, each of the multiple of pilot zones P, centered along its respective axis F, are located circumferentially in line with one of the respective multiple of first main zones M1. For purposes of example, but not limitation, eight (8) pilot zones P; sixteen (16) quench zones Q; eight (8) first main zones M1; and eight (8) second main zones M2 are provided which is relatively less complicated system.

The circumferentially staging and opposed swirled quench zones tailor the mixing of multiple stages, reduce cost, address coking potentialities, and facilitate control of combustion dynamics.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A combustor section for a gas turbine engine comprising:
   an outer wall assembly;
   an inner wall assembly inboard of the outer wall assembly to define an annular combustion chamber therebetween;
   a forward fuel injection system in communication with the annular combustion chamber, the forward fuel injection system including a plurality of forward fuel injectors;
   a downstream fuel injection system in communication with the annular combustion chamber through the outer wall assembly, the downstream fuel injection system including a plurality of downstream fuel injectors, wherein one of the plurality of downstream fuel injectors is circumferentially aligned with one of the plurality of forward fuel injectors relative to an axis of the gas turbine engine, and wherein another one of the plurality of downstream fuel injectors is circumferentially aligned between a circumferential adjacent pair of the plurality of forward fuel injectors relative to the axis; and
   a swirl mixer system in communication with the annular combustion chamber through the inner wall assembly.

2. The combustor section as recited in claim 1, wherein the plurality of downstream fuel injectors includes a multiple of first downstream fuel nozzles that alternate with a multiple of second downstream fuel nozzles.

3. The combustor section as recited in claim 2, wherein the multiple of first downstream fuel nozzles and the multiple of second downstream fuel nozzles are fueled in pairs.

4. The combustor section as recited in claim 3, wherein the multiple of first downstream fuel nozzles are fueled through the multiple of second downstream fuel nozzles such that the multiple of first downstream fuel nozzles are each downstream to a respective one of the multiple of second downstream fuel nozzles.

5. The combustor section as recited in claim 4, further comprising a valve in each of the multiple of second downstream fuel nozzles which selectively communicate fuel to a respective one of the multiple of first downstream fuel nozzles.

6. The combustor section as recited in claim 2, wherein each of the multiple of first downstream fuel nozzles is operable to generate a first main zone within the annular combustion chamber, and each of the multiple of second downstream fuel nozzles is operable to generate a second main zone within the annular combustion chamber.

7. A combustor section for a gas turbine engine comprising:
   an outer wall assembly;
   an inner wall assembly inboard of the outer wall assembly to define an annular combustion chamber therebetween;
   a forward fuel injection system in communication with the annular combustion chamber;
   a downstream fuel injection system in communication with the annular combustion chamber through the outer wall assembly; and
   a swirl mixer system in communication with the annular combustion chamber through the inner wall assembly;

wherein the downstream fuel injection system includes a multiple of first downstream fuel nozzles that alternate with a multiple of second downstream fuel nozzles;

wherein each of the multiple of first downstream fuel nozzles is operable to generate a first main zone within the annular combustion chamber, and each of the multiple of second downstream fuel nozzles is operable to generate a second main zone within the annular combustion chamber; and wherein the swirl mixer system includes a multiple of swirlers, and each of the swirlers is configured to generate a quench zone directed circumferentially between each first main zone and each associated second main zone.

8. The combustor section as recited in claim 7, wherein each quench zone overlaps with a respectively adjacent quench zone to define a shear region.

9. The combustor section as recited in claim 8, wherein the forward fuel injection system includes a multiple of forward fuel injectors, and each of the forward fuel injectors is operable to generate a pilot zone.

10. The combustor section as recited in claim 9, wherein each of the pilot zones is circumferentially located between each first main zone and each associated second main zone.

11. The combustor section as recited in claim 10, further comprising sixteen (16) pilot zones; sixteen (16) quench zones; eight first main zones; and eight (8) second main zones.

12. The combustor section as recited in claim 9, wherein each of the pilot zones is circumferentially located in line with each first main zone.

13. The combustor section as recited in claim 12, further comprising eight (8) pilot zones; sixteen (16) quench zones; eight first main zones; and eight (8) second main zones.

* * * * *